United States Patent
Saraclar et al.

(10) Patent No.: US 9,965,552 B2
(45) Date of Patent: May 8, 2018

(54) SYSTEM AND METHOD OF LATTICE-BASED SEARCH FOR SPOKEN UTTERANCE RETRIEVAL

(71) Applicant: Nuance Communications, Inc., Burlington, MA (US)

(72) Inventors: Murat Saraclar, Jersey City, NJ (US); Richard William Sproat, Mahomet, IL (US)

(73) Assignee: Nuance Communications, Inc., Burlington, MA (US)

( * ) Notice: Subject to any disclaimer, the term of this patent is extended or adjusted under 35 U.S.C. 154(b) by 0 days. days.

(21) Appl. No.: 15/055,975

(22) Filed: Feb. 29, 2016

(65) Prior Publication Data

US 2016/0179947 A1    Jun. 23, 2016

Related U.S. Application Data

(63) Continuation of application No. 14/200,700, filed on Mar. 7, 2014, now Pat. No. 9,286,890, which is a
(Continued)

(51) Int. Cl.
| | |
|---|---|
| *G06F 17/30* | (2006.01) |
| *G10L 13/00* | (2006.01) |
| *G10L 15/08* | (2006.01) |
| *G10L 15/14* | (2006.01) |
| *G10L 15/197* | (2013.01) |

(52) U.S. Cl.
CPC ........ *G06F 17/30755* (2013.01); *G10L 13/00* (2013.01); *G10L 15/08* (2013.01); *G10L 15/142* (2013.01); *G10L 15/197* (2013.01); *G10L 2015/085* (2013.01)

(58) Field of Classification Search
CPC .... G10L 25/54; G10L 15/02; G10L 2015/088
See application file for complete search history.

(56) References Cited

U.S. PATENT DOCUMENTS

| 5,870,706 A | 2/1999 | Alshawi |
|---|---|---|
| 6,317,712 B1 | 11/2001 | Kao et al. |

(Continued)

FOREIGN PATENT DOCUMENTS

| JP | 2001/215986 | 8/2001 |
|---|---|---|
| JP | 2004-005600 | 1/2004 |
| WO | WO 2004/036545 | 4/2004 |

OTHER PUBLICATIONS

Steinbiss, "A search organization for large vocabulary recognition based upon N-best decoding," in Proc. $2^{nd}$ Eur. Conf. Speech Communications and Technology, vol. 3, Sep. 1991, pp. 1217-1220.
(Continued)

*Primary Examiner* — Brian L Albertalli

(57) ABSTRACT

A system and method are disclosed for retrieving audio segments from a spoken document. The spoken document preferably is one having moderate word error rates such as telephone calls or teleconferences. The method comprises converting speech associated with a spoken document into a lattice representation and indexing the lattice representation of speech. These steps are performed typically off-line. Upon receiving a query from a user, the method further comprises searching the indexed lattice representation of speech and returning retrieved audio segments from the spoken document that match the user query.

20 Claims, 5 Drawing Sheets

Related U.S. Application Data continuation of application No. 13/052,819, filed on Mar. 21, 2011, now Pat. No. 8,670,977, which is a continuation of application No. 10/923,915, filed on Aug. 23, 2004, now Pat. No. 7,912,699.

(56) References Cited

U.S. PATENT DOCUMENTS

| | | |
|---|---|---|
| 6,397,181 B1 | 5/2002 | Li et al. |
| 6,574,595 B1 | 6/2003 | Mitchell et al. |
| 6,757,652 B1 | 6/2004 | Lund et al. |
| 6,877,001 B2 | 4/2005 | Wolf et al. |
| 6,963,837 B1 | 11/2005 | Finke et al. |
| 6,990,448 B2 | 1/2006 | Charlesworth et al. |
| 7,113,910 B1 | 9/2006 | Pereira et al. |
| 7,181,398 B2 | 2/2007 | Thong et al. |
| 7,219,058 B1 | 5/2007 | Rose et al. |
| 7,257,533 B2 | 8/2007 | Charlesworth et al. |
| 2003/0093419 A1 | 5/2003 | Bangalore et al. |
| 2006/0036438 A1 | 2/2006 | Chang |
| 2007/0033003 A1 | 2/2007 | Morris |

OTHER PUBLICATIONS

Willett et al., "Smoothed language model incorporation for efficient time-synchronous beam search decoding in LVCSR," Automatic Speech Recognition and Understanding, 2001, ASRU '01, IEEE Workshop on, 2001, pp. 178-181.

Scharenborg et al., "Early Recognition of Words in Continuous Speech", Proc. IEEE Automatic Speech Recognition and Understanding Workshop, Nov.-Dec. 2003, pp. 61-66.

Ng. "Subword-based Approaches for Spoken Document Retrieval", Ph.D. Dissertation, MIT, Feb. 2000, pp. 1-187.

Mills et al., "AT&TV: Broadcast Television and Radio Retrieval," Proceedings of RIAO'2000: Content-Based Multimedia Information Access, 2000, pp. 1135-1144.

Abberley et al., "The THISL Spoken Document Retrieval System," NIST Special Publication 500-240 Proc. TREC-6, 1997, pp. 747-751.

Yu et al., "A hybrid word/phoneme-based approach for improved vocabulary-independent search in spontaneous speech," Proc. ICLSP '04, May 2004.

Siegler, M., "Integration of Continuous Speech Recognition and Information Retrieval for Mutually Optimal Performance," Ph.D. Thesis, Carnegie Mellon University, 1999.

M. Saraclar and R. Sproat, "Lattice-Based Search for Spoken Utterance Retrieval," HTL-NAACL 04, May 2004, pp. 129-136, XP002395968, Boston, USA.

M.G. Brown et al., "Open-Vocabulary Speech Indexing for Voice and Video Mail Retrieval," 1996, In Proc. ACM Multimedia '96, pp. 307-316, Boston Massachusetts, USA, November.

M. Witbrock et al., "Using Words and Phonetic Strings for Efficient Information Retrieval from Imperfectly Transcribeb Spoken Documents," 1997, In ACM International Conference on Digital Libraries (DL'97), pp. 30-35, Philadelphia, PA, USA, July.

P.C. Woodland et al., "Effects of Our of Vocabulary Words in Spoken Document Retrieval," In Proc. SIGIR, pp. 372-374, Athens, Greece.

G.J.F. Jones et al., "Retrieving Spoken Documents by Combinind Multiple Index Sources," In Proc. SIGIR 96, pp. 30-38, Zurich, Switzerland, August.

S. Srinivasan et al., "Phonetic Confusion Matrix Based Spoken Document Retrieval," In Proceedings of the 23$^{rd}$ Annual International ACM SIGIR Conference on Research and Development in Information Retrieval, pp. 81-87, Athens, Greece, 2000.

B. Logan et al., "Word and Sub-Word Indexing Approaches for Reducing the Effects of OOV Queries on Spoken Audio," In Proc. HTL. San Diego, California, USA,2002.

M. Wechsler et al., "New Techniques of Open-Vocabulary Spoken Documents Retrieval," In Proceedings of at the 21$^{st}$ Annual International ASM SIGIR Conference on Research and Development in Information Retrieval, pp. 20-27, Melbourne, Australia, 1998.

A. Amir et al., "Advances in Phonetic Word Spotting," In Proceedings of the Tenth International Conference on Information and Knowledge Management, pp. 680-582, Atlanta, GA, USA, 2001.

Hara, Noriyo et al., "A Vide Retrieval System Using Automatic Speech Recognition—Improvement of Keyword Detection", The 2001 Spring Meeting of the Acoustic Society of Japan, Mar. 14, 2001 pp. 221-222.

Nisizaki, Hiromitsu et al., "Retrieval Method of Broadcast News Documents in Speech Database via Voice Input Keywords", Information Processing Society of Japan, vol. 42, No. 12, pp. 3173-3184, Dec. 15, 2001.

Oka, Ryuich et al., "Speech and Text Retrieval using Phoneme Sequence Representation and Continuous Dynamic Programming", the Institute of Electronics, Information and Communications Engineers, vol. 101, No. 155, pp. 29-36, Jun. 21, 2001.

Rabiner, Lawrence, "A tutorial on hidden Markov models and selected applications in speech recognition," Proceedings of the IEEE 77.2 (1989): 257-286.

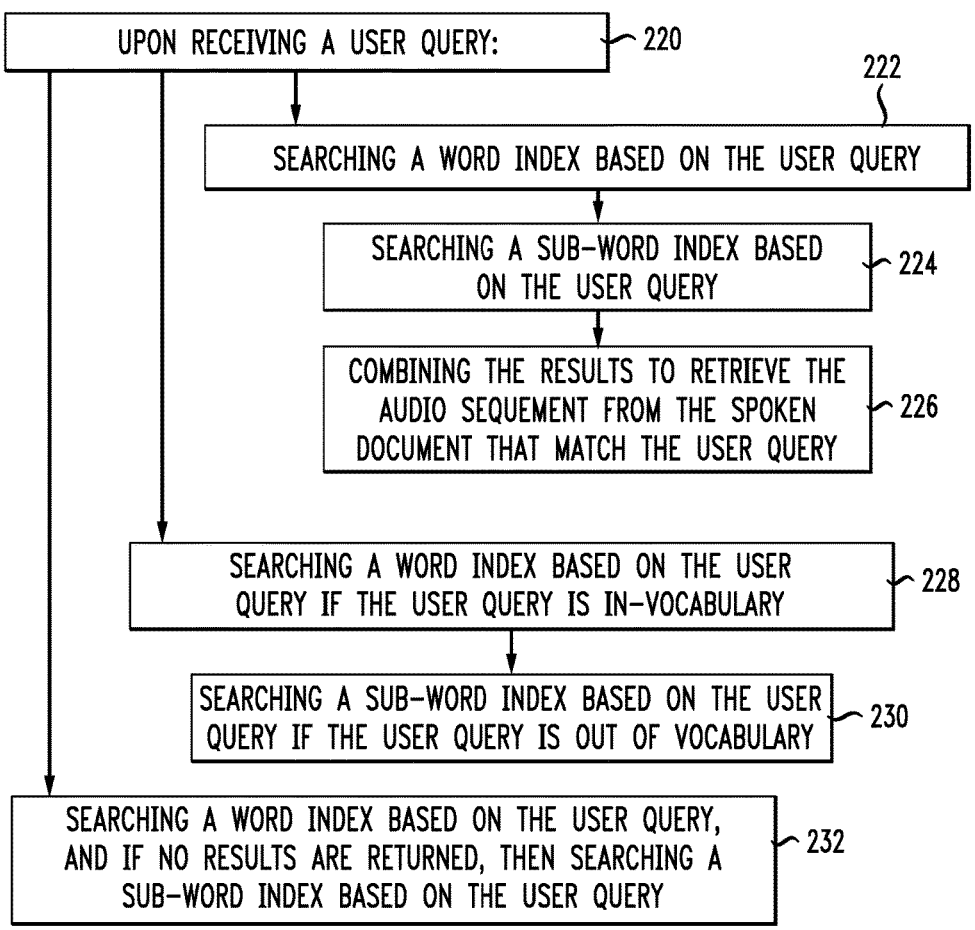

SYSTEM AND METHOD OF LATTICE-BASED SEARCH FOR SPOKEN UTTERANCE RETRIEVAL

PRIORITY INFORMATION

This application is a continuation of U.S. patent application Ser. No. 14/200,700, filed Mar. 7, 2014, which is a continuation of U.S. patent application Ser. No. 13/052,819, filed Mar. 21, 2011, now U.S. Pat. No. 8,670,977, filed Mar. 11, 2014, which is a continuation application of U.S. patent application Ser. No. 10/923,915, filed on Aug. 23, 2004, now U.S. Pat. No. 7,912,699, issued on Mar. 22, 2011, the content of which are included herewith in their entirety.

BACKGROUND OF THE INVENTION

1. Field of the Invention

The present invention relates to retrieval of spoken documents and more specifically to a system and method of performing a lattice-based search for retrieval of a spoken utterance.

2. Introduction

Automatic systems for indexing, archiving, searching and browsing through large amounts of spoken communications have become a reality in the last decade. Most such systems use an automatic speech recognition (ASR) component to convert speech to text which is then used as an input to a standard text based information retrieval (IR) component. This strategy works reasonably well when speech recognition output is mostly correct or the documents are long enough so that some occurrences of the query terms are recognized correctly. Most of the research in this area has concentrated on retrieval of Broadcast News type of spoken documents where speech is relatively clean and the documents are relatively long. In addition, it is possible to find large amounts of text with similar content in order to build better language models and enhance retrieval through use of similar documents.

However, for contexts where spoken document retrieval is desirable but the benefits of clean speech are unavailable, information retrieval becomes more difficult. For example, if one were to record a teleconference and then desire to perform a search or information retrieval of the portions of the conference, the problem becomes more difficult. This is due to the fact that the teleconference likely consists of a plurality of short audio segments that may include many word errors and low redundancy. Further, as opposed to news broadcasts, there may be many speakers in the teleconference each providing small snippets of speech that contributes to the overall spoken document.

Therefore, the same approach used for broadcast news will not provide satisfactory results if one's task is to retrieve a short snippet of speech in a domain where WER's can be as high as 50%. This is the situation with teleconference speech, where one's task is to find if and when a participant uttered a certain phrase.

What is needed in the art are techniques that provide improved spoken document retrieval systems for spoken documents generated from telephone conversations or teleconferences and the like.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein is an indexing procedure for spoken utterance retrieval that works on lattices rather than just single-best text. This procedure can improve F scores by over five points compared to single-best retrieval on tasks with poor WER and low redundancy. The representation is flexible so that both word lattices and phone lattices may be represented, the latter being important for improving performance when searching for phrases containing out of vocabulary (OOV) words.

The invention comprises systems, methods and computer-readable media for providing a lattice-based search for spoken utterance retrieval. A spoken document as referred to herein is preferably a document having moderate word error rates such as telephone calls or teleconferences. The method comprises converting speech associated with a spoken document into a lattice representation and indexing the lattice representation of speech. These steps are performed typically off-line. Upon receiving a query from a user, the method further comprises searching the indexed lattice representation of speech and returning retrieved audio segments from the spoken document that match the user query.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2B illustrates another method according to an embodiment of the invention;

DETAILED DESCRIPTION OF THE INVENTION

The present invention may be understood by the following description of the various embodiments of the invention. The invention extends audio segment retrieval techniques to scenarios such as telephone calls and teleconferencing applications. The task is locating occurrences of a query in spoken communications to aid browsing. The approach is related to spoken document retrieval and word spotting. In one case, the process involves identifying a short segment of audio which may be termed a "document" within a larger group of audio segments. Similarly, each audio segment may be termed a document.

Although reasonable retrieval performance can be obtained using the best ASR hypothesis for tasks with moderate (~20%) word error rates, tasks with higher (40-50%) word error rates require use of multiple ASR hypotheses. One aspect of the present invention is the addition of ASR lattices that make the system more robust to recognition errors. A word lattice may be generally termed as a directed graph of words and links between them which can compactly encode a large number of possible sentences. Each word in the lattice is augmented with its observation likelihood so that any particular path though the lattice can be combined with the prior probability derived from other language models. Timing information is also typically provided in a word lattice. See, e.g., Huang, Acero and Hon, *Spoken Language Processing*, Prentice Hall PTR, 2001, pages 664-673. Those of skill in the art understand further the details and structure of word lattices and therefore no more details are provided herein.

Almost all ASR systems have a closed vocabulary that relates to the particular domain or subject matter. This restriction comes from run-time requirements as well as the finite amount of data used for training the language models of the ASR systems. Typically the recognition vocabulary is taken to be the words appearing in the language model training corpus. Sometimes the vocabulary is further reduced to only include the most frequent words in the corpus. The words that are not in this closed vocabulary—the out-of-vocabulary (OOV) words—will not be recognized by the ASR system, contributing to recognition errors. Using phonetic search helps retrieve OOV words.

Figure 1:
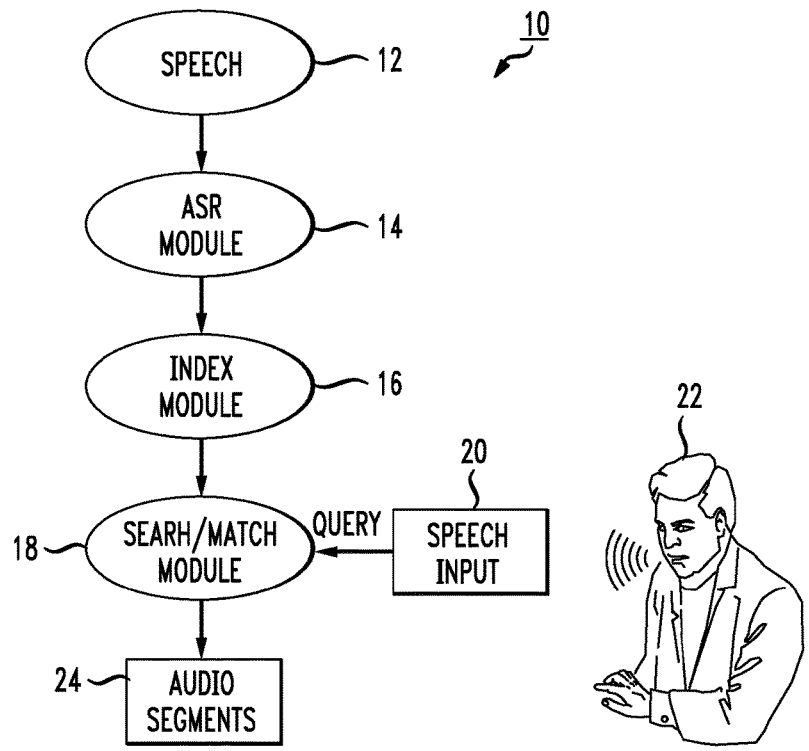
FIG. 1 illustrates a system according to an embodiment of the invention.

FIG. 1 illustrates the basic system 10 of the apparatus embodiment of the invention. Speech 12 is provided to an ASR module 14. The speech 12 may be generated from a telephone call, teleconference or other any other source that has a high word error rate. Although not specifically required for the present invention, it is understood that the speech 12 that is provided has a higher word error rate than speech that may be obtained from a more controlled source such as broadcast news. The ASR module 14 converts speech into a lattice representation of the speech. The ASR module 14 may also provide timing information entries within the lattice or stored separate from the lattice. An index module 16 indexes the lattice representation for efficient retrieval. The two steps of converting the speech to a lattice representation and indexing the lattice are preferably performed off-line. A search and match module 18 receives the speech or other type of input 20 from a user 22 that represents a query. The search and match module 18 receives the query and searches the indexed lattice representations and locates the matching audio segments 24 and returns them to the user.

The basic system shown in FIG. 1 may be employed in many scenarios. For example, the modules may be programmed and operating on a single computer server or on a distributed network. There is no particular programming language that is required to code the modules. The speech input device 20 may be a telephone or other computing device that can receive speech or other multi-modal input from a user 22. There may be various wireless and wired links between the various components of the invention.

As an example of the benefits of the present invention, assume the speech 12 was provided to the ASR module 14 from a teleconference of a builder, architect and a contractor regarding the details of a house to be built that included, among other topics, revised plans to add a home theater room. Assume that the further that the buyer of the house desires to receive the details of the home theater portion of the conversation. After the conference call and the processing of the call according to the present invention wherein the spoken documents may be indexed and retrievable, a person 22 may be able to call in via a computing device and submit a request for the audio segment associated with the home theater. The query (which may be speech, text, or a combination of speech and text or other input modalities) is processed and used to identify, retrieve and return the audio portions related to the home theater to the user 22.

Various features of the process of the present invention have preferable approaches. For example, it is preferred that the ASR module 14 uses a state-of-the-art HMM based large vocabulary continuous speech recognition (LVCSR) system. The acoustic models used with ASR preferably comprise a decision tree state clustered triphones and the output distributions are mixtures of Gaussians. The language models are preferably pruned backoff trigram models. The pronunciation dictionaries preferably contain few alternative pronunciations. Pronunciations that are not in the baseline pronunciation dictionary (including OOV query words) are preferably generated using a text-to-speech (TTS) front-end (not shown) that generates a phonetic representation of text. The TTS front-end can produce multiple pronunciations. The ASR systems may or may not be single pass systems. The recognition networks are preferably represented as weighted finite state machines (FSMs). As can be appreciated, the above approaches present the best mode of practicing the invention. There are alternate approaches known to those of skill in the art that are available and within the scope of the contemplated invention as well.

The output of the ASR module 14 may be preferably represented as an FSM and may also be in the form of a best hypothesis string or a lattice of alternate hypotheses. The labels on the arcs of the FSM may be words or phones, and the conversion between the two can easily be done using FSM composition. The costs on the arcs are negative log likelihoods. Additionally, timing information can also be present in the output.

Figure 2A:
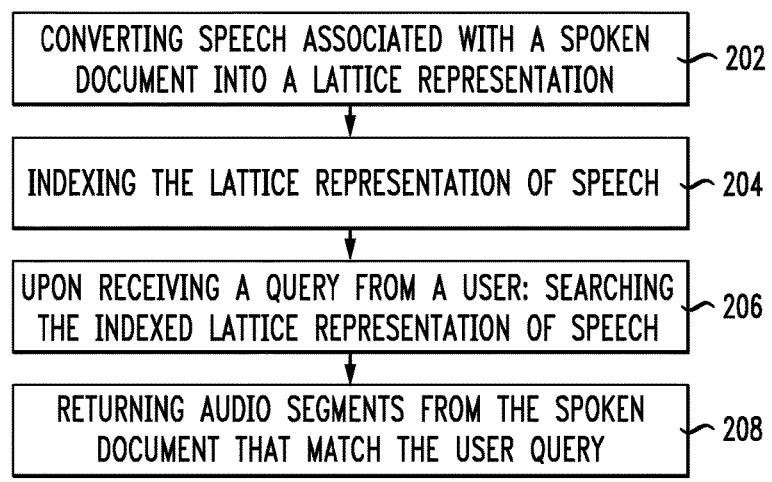
FIG. 2A illustrates a method embodiment of the invention.

FIG. 2A illustrates one of the method embodiments of the invention. This relates to a method of retrieving a spoken document, the method comprises converting speech associated with a spoken document into a lattice representation (202) and indexing the lattice representation (204). Upon receiving a query from a user, the method comprises searching the indexed lattice representation of speech (206) and returning audio segments from the spoken document that match the user query (208).

In the case of lattices, one aspect of the invention relates to storing a set of indices, one for each arc label (word or phone) l, that records the lattice number L[a], input-state k[a] of each arc a labeled with l in each lattice, along with the probability mass f(k[a]) leading to that state, the probability of the arc itself p(a|k[a]) and an index for the next state. To retrieve a single label from a set of lattices representing a speech corpus, one simply retrieves all arcs in each lattice from the label index. The lattices may first be normalized by weight pushing so that the probability of the set of all paths leading from the arc to the final state is 1. After weight pushing, for a given arc a, the probability of the set of all paths containing that arc is given by:

$$p(a) = \sum_{\pi \varepsilon L: a \varepsilon \pi} p(\pi) = f(k[a])p(a \mid k[a])$$

namely, the probability of all paths leading into that arc, multiplied by the probability of the arc itself. For a lattice L a "count" C(l|L) is constructed for a given label l using the information stored in the index I(l) as follows, $$C(l \mid L) = \sum_{\pi \varepsilon L} p(\pi)C(l \mid \pi)$$
$$= \sum_{\pi \varepsilon L} \left( p(\pi) \sum_{a \varepsilon \pi} \delta(a, l) \right)$$
$$= \sum_{a \varepsilon L} \left( \delta(a, l) \sum_{\pi \varepsilon L: a \varepsilon \pi} p(\pi) \right)$$
$$= \sum_{a \varepsilon I(l): L[a]=L} p(a)$$
$$= \sum_{a \varepsilon I(l): L9a)=L} f(k[a])p(a \mid k[a])$$

where C(l$\pi$) is the number of times l is seen on path $\pi$ and $\delta$(a,l), is 1 if arc a has the label l and 0 otherwise. Retrieval can be thresholded so that matches below a certain count are not returned.

To search a multi-label expression (e.g. a multi-word phrase) $w_1 w_2 \ldots w_n$, the system seeks on each label in the expression, and then for each ($w_i$, $w_{i+1}$) join the output states of $w_i$ with the matching input states of $w_{i+1}$; in this way the system retrieves just those path segments in each lattice that match the entire multi-label expression. The probability of each match is defined as $f(k[a_1])p(a_1|k[a_1]p(a_2|k[a_2]) \ldots p)a_n|k[a_n])$, where $p(a_i|k[a_i])$ is the probability of the ith arc in the expression starting in arc $a_1$. The total "count" for the lattice is computed as defined above.

Note that in the limited case where each lattice is an unweighted single path—i.e. a string of labels—the above scheme reduces to a standard inverted index. In order to deal with queries that contain OOV words the present invention uses sub-word units for indexing. One sub-word component may be phones. There are two methods for obtaining phonetic representation of an input utterance.

First, phone recognition using an ASR system where recognition units are phones. This is achieved by using a phone level language model instead of the word level language model used in the baseline ASR system. Second, another aspect is converting the word level representation of the utterance into a phone level representation. This is achieved by using the baseline ASR system and replacing each word in the output by its pronunciation(s) in terms of phones.

Phone recognition may be less accurate than word recognition. On the other hand, the second method can only generate phone strings that are substrings of the pronunciations of in-vocabulary word strings. An alternative to improving on the limitations of each of these approaches is to use hybrid language models used for OOV word detection.

For retrieval, each query word is converted into phone string(s) by using its pronunciation(s). The phone index can then be searched for each phone string. Note that this approach will generate many false alarms, particularly for short query words, which are likely to be substrings of longer words. In order to for control for this, a bound on minimum pronunciation length can be utilized. Since most short words are in vocabulary this bound has little effect on recall.

Another aspect of the invention is shown in FIG. 2B for the scenario where a word index and a sub-word index are available. This aspect utilizes both of the indexes to improve on the process. Upon receiving a user query (220), the method comprises searching both the word index (222) and the sub-word index (224) and combining the results to retrieve the audio segments from the spoken document that match the user's query (226).

Alternately, upon receiving a user query (220), the method may comprise searching the word index for in-vocabulary queries (228) and searching the sub-word index for OOV queries (230). Yet another alternative is upon receiving a user query (220), the method comprises searching the word index and if no result is returned search the sub-word index (232).

In the first case, if the indices are obtained from ASR best hypotheses, then the result combination is a simple union of the separate sets of results. However, if indices are obtained from lattices, then in addition to taking a union of results, retrieval can be done using a combined score. Given a query q, let $C_w$(q) and $C_p$(q) be the lattice counts obtained from the word index and the phone index respectively. The normalized lattice count is defined for the phone index as $$C_p^{norm}(q) = (Cp(q))^{\frac{1}{|pron(q)|}}$$

where |pron(q)| is the length of the pronunciation of query q. The combined score is then defined to be $$C_{wp}(q) = C_w(q) + \lambda C_p^{norm}(q)$$

where $\lambda$ is an empirically determined scaling factor. In the other cases, instead of using two different thresholds, a single threshold on Cw(q) and $C_p^{norm}$(q) may be used during retrieval.

For evaluating ASR performance, the standard word error rate (WER) may be used as a metric. Since retrieval is the goal, the OOV rate is used by type to measure the OOV word characteristics. For evaluating retrieval performance, precision and recall with respect to manual transcriptions are used. Let Correct (q) be the number of times the query q is found correctly, Answer (q) be the number of answers to the query q, and Reference (q) be the number of times q is found in the reference.

$$\text{Precision}(q) = \frac{\text{Correct}(q)}{\text{Answer}(q)}$$

$$\text{Recall}(q) = \frac{\text{Correct}(q)}{\text{Reference}(q)}$$

The system computes precision and recall rates for each query and report the average over all queries. The set of queries Q consists of all the words seen in the reference except for a stoplist of 100 most common words.

$$\text{Precision} = \frac{1}{|Q|} \sum_{q \varepsilon Q} \text{Precision}(q)$$

$$\text{Recall} = \frac{1}{|Q|} \sum_{q \in Q} \text{Recall}(q)$$

For lattice based retrieval methods, different operating points can be obtained by changing the threshold. The precision and recall at these operating points can be plotted as a curve. In addition to individual precision-recall values, the system also computes the F-measure defined as $$F = \frac{2 \times \text{Precision} \times \text{Recall}}{\text{Precision} + \text{Recall}}$$

and reports the maximum F-measure (maxF) to summarize the information in a precision-recall curve.

Three different corpora are used to assess the effectiveness of different retrieval techniques. The first corpus is the DARPA Broadcast News corpus consisting of excerpts from TV or radio programs including various acoustic conditions. The test set is the 1998 Hub-4 Broadcast News (hub4e98) evaluation test set (available from LDC, Catalog no. LDC2000S86) which is 3 hours long and was manually segmented into 940 segments. It contains 32411 word tokens and 4885 word types. For ASR, a real-time system may be used. Since the system was designed for SDR, the recognition vocabulary of the system has over 200,000 words.

The second corpus is the Switchboard corpus consisting of two party telephone conversations. The test set is the RT02 evaluation test set which is 5 hours long, has 120 conversation sides and was manually segmented into 6266 segments. It contains 65255 word tokens and 3788 word types. For ASR, the first pass of the evaluation system was used. The recognition vocabulary of the system has over 45,000 words.

The third corpus is named Teleconferences since it consists of multiparty teleconferences on various topics. The audio from the legs of the conference are summed and recorded as a single channel. A test set of six teleconferences (about 3.5 hours) was transcribed. It contains 31106 word tokens and 2779 word types. Calls are automatically segmented into a total of 1157 segments prior to ASR, using an algorithm that detects changes in the acoustics. The first pass of the Switchboard evaluation system was used for ASR.

Table 1 shows the ASR performance on these three tasks as well as the OOV Rate by type of the corpora. This table illustrates the word error rate (WER) and OOV Rate by type of various LVCSR tasks. It is important to note that the recognition vocabulary for the Switchboard and Teleconferences tasks are the same and no data from the Teleconferences task was used while building the ASR systems.

TABLE 1

| Task | WER | OOV Rate by Type |
|---|---|---|
| Broadcast News | ~20% | 0.6% |
| Switchboard | ~40% | 6% |
| Teleconferences | ~50% | 12% |

As a baseline, the best word hypotheses of the ASR system are used for indexing and retrieval. The performance of this baseline system is given in Table 1. As expected, very good performance is obtained on the Broadcast News corpus. It is interesting to note that when moving from Switchboard to Teleconferences the degradation in precision-recall is the same as the degradation in WER.

TABLE 2

| Task | WER | Precision | Recall |
|---|---|---|---|
| Broadcast News | ~20% | 92% | 77% |
| Switchboard | ~40% | 74% | 47% |
| Teleconferences | ~50% | 65% | 37% |

Figure 3:
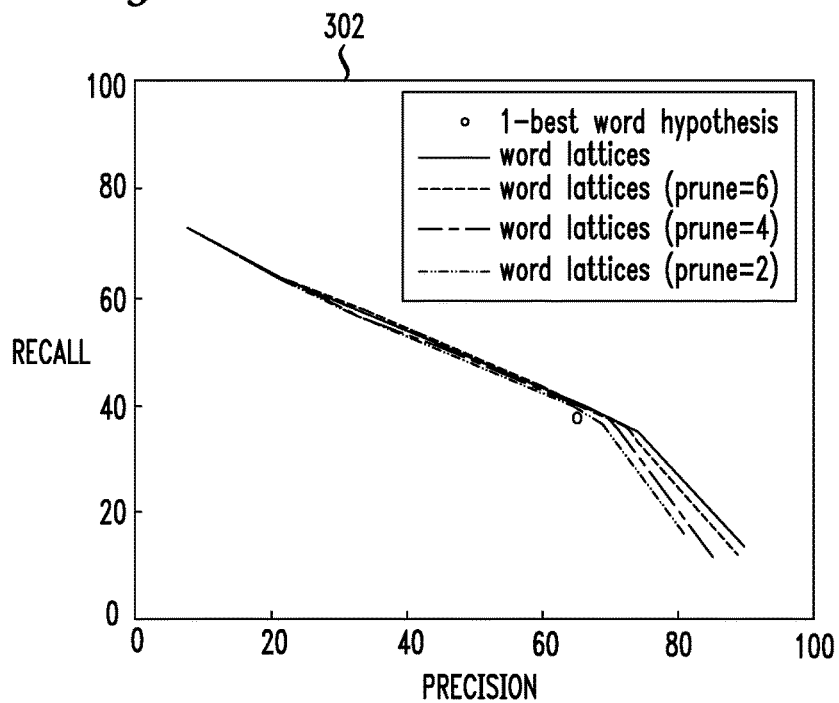
FIG. 3 shows experimental results related to precision recall using word lattices for teleconferences.

The second set of experiments investigated the use of ASR word lattices. In order to reduce storage requirements, lattices can be pruned to contain only the paths whose costs (i.e. negative log likelihood) are within a threshold with respect to the best path. The smaller this cost threshold is, the smaller the lattices and the index files are. FIG. 3 illustrates the precision-recall curves 302 for different pruning thresholds on the Teleconferences task.

Table 3 shows the resulting index sizes and maximum F-measure values. On the teleconferences task, it was observed that cost=6 yields good results, and used this value for the rest of the experiments.

Note that this increases the index size with respect to the ASR 1-best case by 3 times for Broadcast News, by 5 times for Switchboard and by 9 times for Teleconferences.

TABLE 3

| Task | Pruning | Size | maxF |
|---|---|---|---|
| Broadcast News | nbest = 1 | 29 | 84.0 |
| Broadcast News | cost = 6 | 91 | 84.8 |
| Switchboard | nbest = 1 | 18 | 57.1 |
| Switchboard | cost = 6 | 90 | 58.4 |
| Teleconferences | nbest = 1 | 16 | 47.4 |
| Teleconferences | cost = 2 | 29 | 49.5 |
| Teleconferences | cost = 4 | 62 | 50.0 |
| Teleconferences | cost = 6 | 142 | 50.3 |
| Teleconferences | cost = 12 | 3100 | 50.1 |

Next, investigations compared using the two methods of phonetic transcription discussed above—phone recognition and word-to-phone conversion—for retrieval using only phone lattices. In Table 4 the precision and recall values that yield the maximum F-measure as well as the maximum F-measure values are presented. These results clearly indicate that phone recognition is inferior to other approaches.

TABLE 4

| Source for Indexing | Precision | Recal | maxF |
|---|---|---|---|
| Phone Recognition | 25.6 | 37.3 | 30.4 |
| Conversion from Words | 43.1 | 48.5 | 45.6 |

The strategy of searching the word index, if no result is returned search the phone index, is preferred to the other strategies. Table 5 compares the maximum F-values for the three strategies for using word and phone indices.

TABLE 5

| Strategy | maxF |
|---|---|
| 1. combination | 50.5 |
| 2. vocabulary cascade | 51.0 |
| 3. search cascade | 52.8 |

Figure 4:
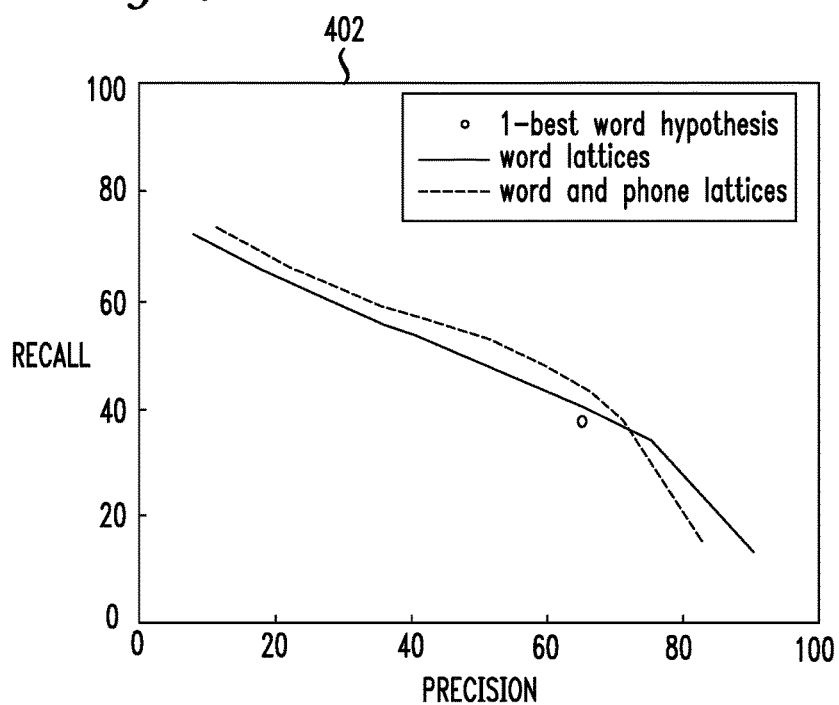
FIG. 4 shows a comparison of word lattices and word/phone hybrid strategies for teleconferences.

FIG. 4 presents results 402 for this strategy on the Teleconferences corpus. The phone indices used in these experiments were obtained by converting the word lattices into phone lattices. Using the phone indices obtained by phone recognition gave significantly worse results.

Figure 5:
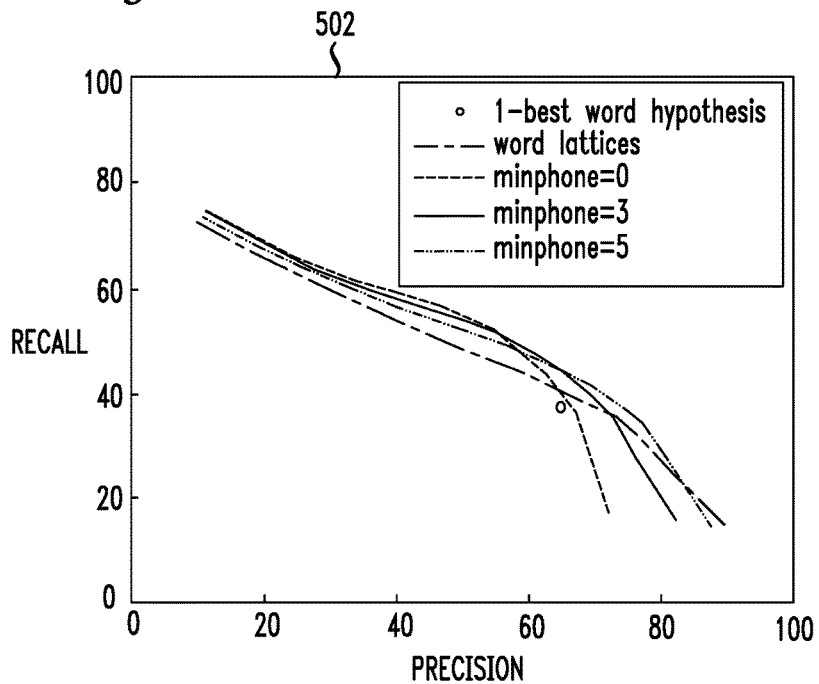
FIG. 5 shows the effect of minimum pronunciation length using a word/phone hybrid strategy for teleconferencing.

When searching for words with short pronunciations in the phone index the system will produce many false alarms. One way of reducing the number of false alarms is to disallow queries with short pronunciations. FIG. 5 show the effect of imposing a minimum pronunciation length for queries 502. For a query to be answered its pronunciation has to have more than minphone phones, otherwise no answers are returned. Best maximum F-measure result is obtained using minphone=3. Thus, this figure shows the effect of minimum pronunciation length using a word/phone hybrid strategy for teleconferences.

Figure 6:
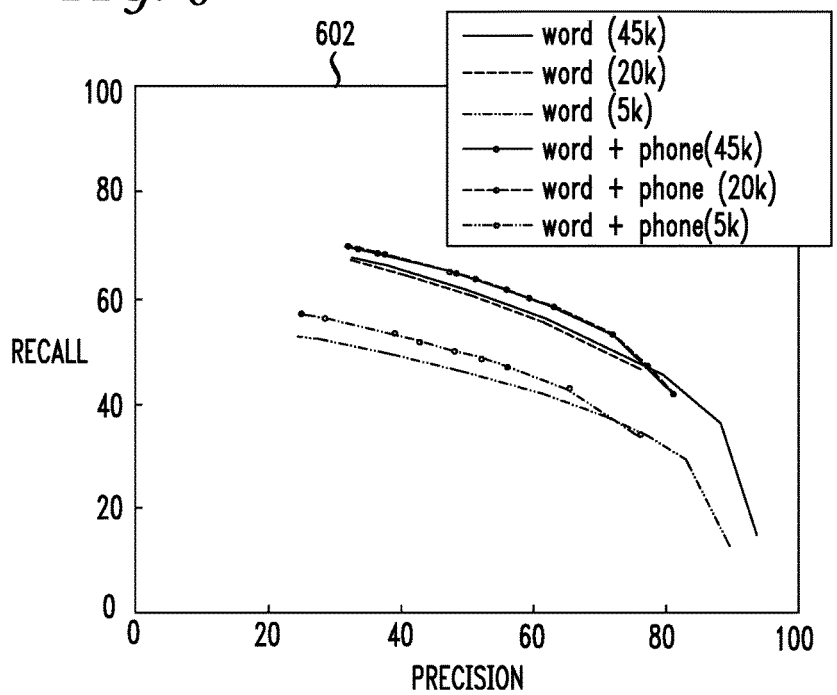
FIG. 6 shows a comparison of various recognition vocabulary sizes for telephone conversations.

FIG. 6 presents results 602 for different recognition vocabulary sizes (5 k, 20 k, 45 k) on the Switchboard corpus. The OOV rates by type are 32%, 10% and 6% respectively. The word error rates are 41.5%, 40.1% and 40.1% respectively. The precision recall curves are almost the same for 20,000 and 45,000 vocabulary sizes.

So far, in all the experiments the query list consisted of single words. In order to observe the behavior of various methods when faced with longer queries, a set of word pair queries was used in a study. Instead of using all the word pairs seen in the reference transcriptions, the ones which were more likely to occur together were chosen than with other words. For this, the word pairs ($w_1, w_2$) were sorted according to their pointwise mutual information $$\log \frac{p(w_1, w_2)}{p(w_1)p(w_2)}$$

and used the top pairs as queries in our experiments.

As it turns out, the precision of the system is very high on this type of queries. For this reason, it is more interesting to look at the operating point that achieves the maximum F-measure for each technique, which in this case coincides with the point that yields the highest recall. Table 6 presents results on the Switchboard corpus using 1004 word pair queries. Using word lattices it is possible to increase the recall of the system by 16.4% while degrading the precision by only 2.2%. Using phone lattices another 3.7% increase can be achieved in recall for 1.2% loss in precision. The final system still has 95% precision.

TABLE 6

| System | Precision | Recall | F- |
|---|---|---|---|
| Word 1-best | 98.3 | 29.7 | 45.6 |
| Word lattices | 96.1 | 46.1 | 62.3 |
| Word + Phone lattices | 94.9 | 49.8 | 65.4 |

Finally, a comparison of various techniques on different tasks is shown in Table 7 where the maximum F-measure (maxF) is given. Using word lattices yields a relative gain of 3-5% in maxF over using best word hypotheses. For the final system that uses both word and phone lattices, the relative gain over the baseline increases to 8-12%.

Figure 7:
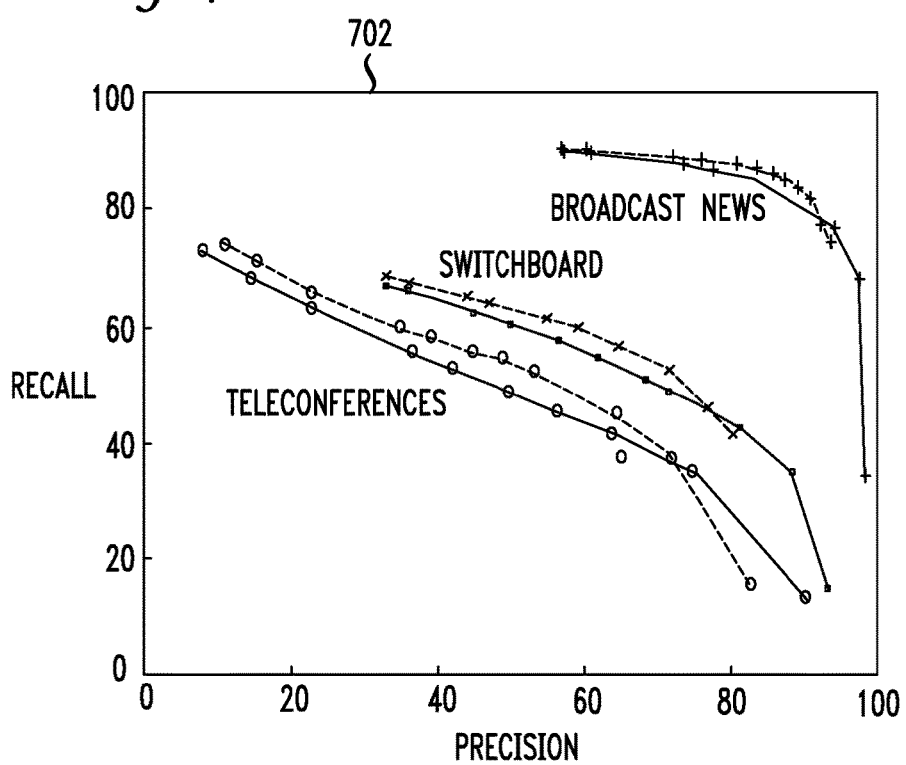
FIG. 7 shows a precision versus recall comparison for various techniques on different tasks.

FIG. 7 presents the precision recall curves 702. The gain from using better techniques utilizing word and phone lattices increases as retrieval performance gets worse. FIG. 7 shows the precision recall for various techniques on different tasks. The tasks are Broadcast News (+), Switchboard (x), and Teleconferences (o). The techniques are using best word hypotheses (single points), using word lattices (solid lines), and using word and phone lattices (dashed lines).

TABLE 7

| | System | | |
|---|---|---|---|
| Task | 1-best | W Lats | W + P Lats |
| Broadcast News | 84.0 | 84.8 | 86.0 |
| Switchboard | 57.1 | 58.4 | 60.5 |
| Teleconferences | 47.4 | 50.3 | 52.8 |

Disclosed herein is an indexing procedure for spoken utterance retrieval that works on ASR lattices rather than just single-best text. It was demonstrated that this procedure can improve maximum F-measure by over five points compared to single-best retrieval on tasks with poor WER and low redundancy. The representation is flexible so that both word lattices, as well as phone lattices, can be represented, the latter being important for improving performance when searching for phrases containing OOV words. It is important to note that spoken utterance retrieval for conversational speech has different properties than spoken document retrieval for broadcast news. Although consistent improvements were observed on a variety of tasks including Broadcast News, the procedure proposed here is most beneficial for more difficult conversational speech tasks like Switchboard and Teleconferences.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
   receiving data corresponding to a text query from a user;
   retrieving a spoken document associated with the text query;
   searching a word index of the spoken document associated with the text query using the text query, to yield first search results;
   searching a sub-word index of the spoken document associated with the text query using the text query, to yield second search results; and
   returning, via a computer network and according to the first search results and the second search results, audio segments from the spoken document associated with the text query which correspond to the text query.

2. The method of claim 1, further comprising combining the first search results and the second search results to yield combined results.

3. The method of claim 2, wherein returning the audio segments from the spoken document associated with the text query is further based on the combined results.

4. The method of claim 1, wherein searching the word index of the spoken document associated with the text query using the text query further comprises searching the word index for an in-vocabulary portion of the text query.

5. The method of claim 1, wherein searching the sub-word index of the spoken document associated with the text query using the text query further comprises searching the sub-word index for an out-of-vocabulary portion of the text query.

6. The method of claim 1, wherein the text query comprises at least one text query word.

7. The method of claim 1, wherein the text query is converted to text via automatic speech recognition.

8. A system comprising:
   a processor; and
   a computer-readable storage medium having instructions stored which, when executed by the processor, cause the processor to perform operations comprising:
   receiving data corresponding to a text query from a user;
   retrieving a spoken document associated with the text query;
   searching a word index of the spoken document associated with the text query using the text query, to yield first search results;
   searching a sub-word index of the spoken document associated with the text query using the text query, to yield second search results; and
   returning, via a computer network and according to the first search results and the second search results, audio segments from the spoken document associated with the text query which correspond to the text query.

9. The system of claim 8, the computer-readable storage medium having additional instructions stored which result in operations comprising combining the first search results and the second search results to yield combined results.

10. The system of claim 9, wherein returning the audio segments from the spoken document associated with the text query is further based on the combined results.

11. The system of claim 8, wherein searching the word index of the spoken document associated with the text query using the text query further comprises searching the word index for an in-vocabulary portion of the text query.

12. The system of claim 11, wherein searching the sub-word index of the spoken document associated with the text query using the text query further comprises searching the sub-word index for an out-of-vocabulary portion of the text query.

13. The system of claim 12, wherein the text query comprises at least one text query word.

14. The system of claim 8, wherein the text query from the user is converted to text via automatic speech recognition.

15. A computer-readable storage device having instructions stored which, when executed by a processor, cause the processor to perform operations comprising:
   receiving data corresponding to a text query from a user;
   retrieving, based on the text query, a spoken document;
   searching a word index of the spoken document associated with the text query using the text query, to yield first search results;
   searching a sub-word index of the spoken document associated with the text query using the text query, to yield second search results; and
   returning, via a computer network and according to the first search results and the second search results, audio segments from the spoken document associated with the text query which correspond to the text query.

16. The computer-readable storage device of claim 15, having additional instructions stored which result in operations comprising combining the first search results and the second search results to yield combined results.

17. The computer-readable storage device of claim 16, wherein returning the audio segments from the spoken document associated with the text query is further based on the combined results.

18. The computer-readable storage device of claim 15, wherein searching the word index of the spoken document associated with the text query using the text query further comprises searching the word index for an in-vocabulary portion of the text query.

19. The computer-readable storage device of claim 15, wherein searching the sub-word index of the spoken document associated with the text query using the text query further comprises searching the sub-word index for an out-of-vocabulary portion of the text query.

20. The computer-readable storage device of claim 15, wherein the text query comprises at least one text query word.

* * * * *